United States Patent [19]

Beyts

[11] Patent Number: 4,915,969

[45] Date of Patent: Apr. 10, 1990

[54] SWEETENER FOR BEVERAGES

[75] Inventor: Pamela K. Beyts, Reading, Great Britain

[73] Assignee: Tate & Lyle PLC, Great Britain

[21] Appl. No.: 380,304

[22] Filed: Jul. 17, 1989

Related U.S. Application Data

[63] Continuation-in-part of Ser. No. 699,791, Feb. 8, 1985, abandoned.

[30] Foreign Application Priority Data

Feb. 10, 1984 [GB] United Kingdom ................. 8403612

[51] Int. Cl.$^4$ ................................................ A23L 1/09
[52] U.S. Cl. ..................................... 426/548; 426/590
[58] Field of Search ............... 426/548, 590, 594, 591, 426/597, 432, 435, 804

*Primary Examiner*—Carolyn Paden
*Attorney, Agent, or Firm*—Ostrolenk, Faber, Gerb & Soffen

[57] ABSTRACT

Beverages such as carbonated, acid-pH soft drinks and tea and coffee, can be sweetened with a combination of two components: 1, a chlorosucrose sweetener such as sucralose 2, cyclamate, either alone or together with one or two other low-calorie sweeteners, the sweetness contribution by the two components being from 90%:10% to 10%:90% respectively, the percentage of sweetness provided by the cyclamate in component 2 being from 30 to 100%.

20 Claims, No Drawings

SWEETENER FOR BEVERAGES

This invention is a continuation in part of U.S. application Ser. No. 06/699,791 filed Feb. 8, 1985 now abandoned.

BACKGROUND OF THE INVENTION

This invention relates to the sweetening of beverages, including carbonated soft drinks and also tea and coffee. The soft drinks include especially those possessing a cola flavour and, in particular, calorie-reduce and dietary drinks.

Beverages such as cola, tea and coffee have been generally sweetened with sucrose or, for dietary reasons, with saccharin and its non-toxic, water-soluble salts. It is a peculiar nature of the cola flavour that it is particularly sensitive to the choice of sweetener and, therefore, it has been difficult to find a satisfactory replacement for sucrose. Thus, low-calorie formulations of colas based on saccharin usually include various taste modifiers to mask the unpleasant aftertaste of this sweetener, in the same way as when it is used in tea or coffee. It is also well known to modify the taste of saccharin by including in the composition another low-calorie sweetener, such as cyclamate (sodium, potassium, ammonium or calcium salts of cyclohexyl sulfamic acid), the combination providing a preferred quality of sweetness. Another well-known low-calorie sweetener proposed for such use with saccharin is aspartame (L-aspartyl-L-phenylalanine methyl ester; see GB 1,352,167).

Peptide sweeteners, such as aspartame, have been proposed as sweeteners for cola beverages, for example in GB 2,103,917A. Other peptide sweeteners proposed for such use include amino-protected aspartame (GB 2,092,161B); phenyl carbamyl L-aspartyl-L-phenylalanine derivatives (EP 107,597A); other aspartyl dipeptides (U.S. No. 3,879,372 and GB 1,359,123); amides of L-aspartyl-D-serine and L-aspartyl-D-cyclic amino acids (U.S. No. 4,399,163; U.S. No. 4,465,626 and U.S. No. 4,454,328); other L-aspartyl-L-phenylalanine esters (WO 83/01619A and EP 99960A) and tripeptides based on L-aspartic acid. L- and/or D-alanine and L- and/or D-valine (JP 036886 of 07.03.83). However, because of their general lack of stability in acidic environments, peptide sweeteners are not ideally suitaed for such use. Despite this, aspartame is being used widely in diet colas because it has a considerably better taste than saccharin.

Another low-calorie sweetener proposed for use in colas and other beverages is sucralose, 4,1'6'-trichloro-4,1,6'-trideoxy-galactosucrose. This and other chlorine-substituted sucrose sweeteners are disclosed in British Pat. No. 1,544,167 and in British Patent Application No. 2,104,063A.

It has been found that combination of these chlorosucrose sweeteners with certain other sweeteners having and accompanying bitter taste can lead to a marked synergy, that it to say an increase in the quantity of sweetness per unit weight of sweetening composition over its expected sweetness, calculated as the sum of the quantites of sweetness which would be provided by the individual sweeteners at the appropriate concentrations if used alone. Such sweetening compositions are disclosed in British Patent Application No. 2,098,848A. In these combinations, the sweeteners having a accompanying bitter taste include saccharin, acesulfame-K (the potassium salt of 3,4-dihydro-6-methyl-1,2,3-oxathiazin-4-one 2,2-dioxide) and stevioside. In complete contrast, the combination of sucralose with aspartame showed no synergy.

As previously mentioned, the cola flavour is particularly sensitive to the taste of sweeteners and the quality of sweetness is an important factor in determining which sweetener should be used in cola beverages. Since most artificial sweeteners can provide exactly the same quality of sweetness as sucrose, but are distinguishable from sucrose by the quality of sweetness, it is desirable to use as little of them as possible while maintaining the required sweetness level, usually equivalent in colas to around 8.5% sucrose and in tea and coffee to around 5% sucrose.

SUMMARY OF THE INVENTION

We have now found that certain combinations of chlorosucrose sweeteners such as sucralose with cyclamate, with or without one or more other low-calorie sweeteners, can provide substantially quantitative synergy and thus reduce the concentration of low-calorie sweetener required to provide the desired sweetness. In cola, particularly, a synergy of over 100% can be obtained, that is to say the sweetening power of the combination is more than twice the expected sweetening power calculated as the sum of the sweetening powers of the individual components in the combination. This represents a saving of up to about 55% in the amount of low-calorie sweetener needed to provide the required level of sweetness.

The synergy between sucralose and cyclamate is unexpected and surprising both in its nature and magnitude. Unlike the synergies between sucralose and saccharin, acesulfame-K and stevioside, the synergy between sucralose and cyclamate does not depend upon the presence of a bitter taste. In contrast, combinations of sucralose with sweeteners which lack a bitter taste, such as sucrose and aspartame, do not exhibit any synergy at all. Further, the magnitude of the synergy between sucralose and cyclamate is remarkable, generally exceeding 60%, compared with 15% for the best sucralose plus saccharin combination.

According to this invention, there is provided a method of sweetening a beverage by incorporating therein a combination of two components: component 1, a chlorosucorse sweetener such as sucralose; and component 2, cyclamate, either alone or in combination with other low-calorie sweeteners, the sweetness contribution of the two components in the mixture being from 90%:10% to 10%:90%, respectively and the sweetness contribution provided by cyclamate in component 2 being from 30% to 100%.

Preferably, the sweetness contribution of the two components in the mixture is from 80%:20% to 20%:80%; especially from 60%:40% to 40%:60%, e.g. about 50%:50%, in particular when component 2 is 100% cyclamate. In ternary and quaternary compositions, i.e. when component 2 includes one or two other low-calorie sweeteners, the sweetness contribution ratio is preferably from 18%:82% to 73%:27%. In quaternary compositions, in particular, the sweetness contribution ratio is preferably about 25%:75%.

The other low-calorie sweeteners which may be present in component 2 include saccharin and acesulfame-K and dipeptide sweeteners such as aspartame, even though binary mixtures of sucralose and aspartame exhibit little or no quantitative synergy.

Using such combinations, synergies ranging from 48% to 121% can be obtained in cola, binary mixtures of sucralose and cyclamate giving synergies of 61% to 75% and some of the ternary and quaternary mixtures providing even higher levels of synergy. Thus, a ternary combination of sucralose, cyclamate and saccharin with a sweetness contribution ratio of 31:29:40 results in synergy of 121%. Other highly synergistic combinations include sucralose:cyclamate:acesulfame-K:aspartame at 1:1:1:1 (115%), sucralose:cyclamate:saccharin at 18.2:33.6:48.2 (109%), sucralose:cyclamate:saccharin:asparame at 1:1:1:1 (104%) and sucralose:cyclamate:acesulfame-K at 40:30:30 (102%).

Some of the synergy exhibited by the ternary and quaternary combinations of low-calorie sweeteners mentioned above may be provided by the synergies resulting from combinations of pairs of the individual components, e.g. saccharin and cyclamate (U.S. No. 2,803,551), saccharin and sucralose. acesulfame-K and sucralose (GB 2,098,848A), acesulfame-K and aspartame, acesulfame-K and cyclamate (U.S. No. 4,158068), and saccharin and aspartame (Beck, C I, in "Low calorie and special dietary foods", CRC Press, Cleveland, 1978, 59-111). In such ternary and quaternary combinations it is difficult to quantify the contribution of synergies between pairs of components to the overall synergy, particularly when the same components may interact synergistically with two or three other components. However, simple arithmetical apportionment of the contribution of each pair of sweeteners in such combinations indicates that the synergy between sucralose and cyclamate is an important factor in determining the sweetening power of the compositions of the present invention. Thus for the ternary combinations comprising sucralose, cyclamate and saccharin in Table 2 below, the synergy between sucralose and cyclamate accounts for from 28% to 55% of the total synergy of the combination (see Example 3). Further, in quaternary combination comprising sucralose, cyclamate, saccharin and aspartame (1:1:1:1) the synergy between sucralose and cyclamate accounts for 20% of the overall synergy of the combination.

According to a further feature of the invention, there is provided a sweetened beverage in which the sweetness is provided by a two component mixture of low-calorie sweeteners as defined above. There is also provided a bottling syrup for a carbonated soft drink sweetened with the said composition. There is further provided a sweetening composition for adding to tea or coffee of the like (i.e. a "table-top" sweetener) comprising a two component mixture of low calorie sweeteners as defined above in combination with a suitable carrier. The carrier may comprise a bulking agent such that a volume of the sweetening composition is equivalent to an equal volume of sucrose, for example a particulate, low density, water-soluble product such as maltodextrin. Alternatively, the carrier may comprise conventional tablet components such as starch or lactose, or an aqueous solvent system for drops.

DESCRIPTION OF THE PREFERRED EMBODIMENTS

The following examples illustrate the invention further.

EXAMPLE 1

Estimation of synergy

The individual sweetening powers of the low-calorie sweeteners mentioned above are such that the concentrations (% weight by volume, i.e. mg/100 ml) required to provide a sweetness in a typical cola beverage equal to that provided by 8.5% sucrose are as follows:

sucralose: 0.016%
cyclamate: 0.215%
saccharin: 0.0345%
acesulfame-K: 0.0738%
aspartame: 0.0425%

Thus, a 1:1 sweetness contribution ratio for sucralose:cyclamate corresponds to a weight ratio of 0.008:0.1075, or 1:13.44. In more detail, the correspondence between the sweetness contribution ratio and the weight ratio of several combinations of low-calorie sweeteners according to the invention is shown in Table 1.

TABLE 1

| | Component 1 | | Component 2: | | | |
| | | | Saccharin | Acesulfame-K | Aspartame | |
| No. | Sucralose | Cyclamate | Sweetness contribution (%) | | | Weight ratio |
| --- | --- | --- | --- | --- | --- | --- |
| 1 | 80 | 20 | | | | 1:3.36 |
| 2 | 20 | 80 | | | | 1:53.8 |
| 3 | 50 | 50 | | | | 1:13.5 |
| 4 | 73 | 9 | | 18 | | 1:1.66:1.14 |
| 5 | 73 | 9 | 18 | | | 1:1.66:0.53 |
| 6 | 31 | 40 | 29 | | | 1:18:2 |
| 7 | 46.9 | 31.3 | 21.8 | | | 1:9:1 |
| 8 | 63.9 | 21.3 | 14.8 | | | 1:4.5:0.5 |
| 9 | 18.2 | 48.2 | 33.6 | | | 1:36:4 |
| 10 | 25 | 25 | 25 | 25 | | 1:13.5:2.15:4.61 |
| 11 | 25 | 25 | 25 | | 25 | 1:13.5:2.15:2.65 |
| 12 | 90 | 10 | | | | 1:1.5 |
| 13 | 10 | 90 | | | | 1:121 |
| 14 | 40 | 30 | | 30 | | 1:10.1:3.46 |
| 15 | 40 | 30 | | | 30 | 1:10.1:1.99 |
| 16 | 25 | 25 | | 25 | 25 | 1:13.5:4.61:2.65 |

In order to estimate the synergy for a particular combination of low-calorie sweeteners, colas were prepared with the combination of sweeteners in a series of concentrations (test colas) and with 8.5% sucrose (standard cola). Thus, for the sucralose:cyclamate 50:50 combination.

| Sweetener | Sweetness contribution desired | Concentration required theoretically | Weight ratio |
| --- | --- | --- | --- |
| sucralose | 50% | 0.0080 g/100 ml | 1 |

| Sweetener | Sweetness contribution desired | Concentration required theoretically | Weight ratio |
|---|---|---|---|
| cyclamate | 50% | 0.1075 g/100 ml | 13.5 |

A taste panel was used to compare the sweetness of each test cola with the standard cola. The panellists compared pairs of samples, one of each pair being the standard cola and the other being one of the test colas, and were asked to select the sweeter sample of each pair. The number of respondents selecting a test cola as sweeter than the standard was plotted against the concentration of the sweeteners in the test cola and the concentration at which 50% of the responses indicated that the test cola were sweeter than the standard was taken as an estimate of the concentration providing the required level of sweetness. Synergy (increase in sweetening power) was calculated as:

$$\frac{A-B}{B} \times 100\%,$$

where:
A = concentration of sweetener required theoretically; and
B = concentration of sweetener found to be necessary.

Thus, for the sucralose:cyclamate 50:50 combination the amount found experimentally to provide a sweetness equal to that provided by 8.5% sucrose was 0.0659% (0.0046% sucralose and 0.0613% cyclamate). From this the synergy was estimated as:

$$\frac{0.1155 - 0.0659}{0.0659} \times 100 = 75\%.$$

In a similar manner, the saving of sweetener may be derived from formula:

$$\frac{A-B}{A} \times 100\%$$

Thus, for the sucralose:cyclamate 50:50 combination, the saving is estimated as $$\frac{0.1155 - 0.0659}{0.1155} \times 100 = 43\%$$

Applying these methods to combinations of low-calorie sweeteners listed in Table 1, estimates for synergy and saving were obtained as shown in Table 2.

TABLE 2

| No. | Component 1 Sucralose | Component 2: Cyc | Sac Sweetness contribution (%) | Ace | Asp | Synergy % | Saving % |
|---|---|---|---|---|---|---|---|
| 1 | 80 | 20 | — | — | — | 69 | 41 |
| 2 | 20 | 80 | — | — | — | 61 | 38 |
| 3 | 50 | 50 | — | — | — | 75 | 43 |
| 4 | 73 | 9 | — | 18 | — | 80 | 44 |
| 5 | 73 | 9 | 18 | — | — | 48 | 33 |
| 6 | 31 | 40 | 29 | — | — | 121 | 55 |
| 7 | 46.9 | 31.3 | 21.8 | — | — | 87 | 47 |
| 8 | 63.9 | 21.3 | 14.8 | — | — | 51 | 34 |
| 9 | 18.2 | 48.2 | 33.6 | — | — | 109 | 52 |
| 10 | 25 | 25 | 25 | 25 | — | 80 | 44 |
| 11 | 25 | 25 | 25 | — | 25 | 104 | 51 |
| 14 | 40 | 30 | — | 30 | — | 102 | 50 |
| 15 | 40 | 30 | — | — | 30 | 55 | 36 |
| 16 | 25 | 25 | — | 25 | 25 | 115 | 54 |

EXAMPLE 2

Synergy in tea and coffee

In tea and coffee, at 5% sucrose equivalent, the weight ratio of sucralose to cyclamate providing a 50:50 sweetness contribution is different from that in cola at 8.5% sucrose equivalent.

In tea, the ratio is 1:22.85 and in coffee the ratio is 1:21. At these ratios the synergies found are 27% and 25% for tea and coffee, representing savings of 21% and 20%, respectively.

EXAMPLE 3

Apportionment of synergy in ternary combinations

Synergies between pairs of the low-calorie sweeteners included in the ternary combinations of sucralose, cyclamate and saccharin listed in Table 1 in cola beverage (other than sucralose/cyclamate) were estimated by the methods described in Example 1. The results are set out in Table 3.

TABLE 3

| Combination | Sweetness contribution | Synergy | Saving (%) |
|---|---|---|---|
| sucralose/saccharin | 50/50 | 16 | 14 |
| sucralose/saccharin | 60/40 | 16 | 14 |
| sucralose/saccharin | 80/20 | 12 | 11 |
| sucralose/saccharin | 40/60 | 13 | 11 |
| cyclamate/saccharin | 50/50 | 117 | 54 |

It may be assumed that the overall synergy of a ternary combinatin of high intensity sweeteners is proportional to the weighted average of the overlapping synergies between the three pairs of components, thus:

$$S_{abc} = \frac{(C_a + C_b)S_{ab} + (C_b + C_c)S_{bc} + (C_a + C_c)S_{ac}}{(C_a + C_b) + (C_b + C_c) + (C_a + C_c)}$$

where:
$C_a$, $C_b$, $C_c$ = sweetness contributions of sweeteners a, b and c, respectively
$S_{ab}$, $S_{ac}$ and $S_{bc}$ = synergies of combinations a+b, a+c and b+c, respectively;
$S_{abc}$ = overal synergy of combination a+b+c.

On this basis, it will be seen that the relative contribution of each pair of sweeteners to the overall synergy is in the ratio:

$$(C_a+C_b)S_{ab}:(C_b+C_c)S_{bc}:(C_a+C_c)S_{ac}$$

Thus, for combination 5 in Table 1 (sucralose(a):cyclamate(b):saccharin(c) 73:9:18) the ratio is: 82×69):(27×117):(91×16); and the relative contribution of each pair of sweeteners (%) is:
sucralose/cyclamate: 55
cyclamate/saccharin: 31
sucralose/saccharin: 14

Similarly, the relative contribution of each pair of sweeteners in the other sucralose/cyclamate/saccharin combinations listed in Table 1 is as follows:

| Combination No. and pair of sweeteners | Contribution to synergy (%) |
|---|---|
| 6: sucralose/cyclamate | 37 |
| cyclamate/saccharin | 56 |
| sucralose/saccharin | 7 |
| 7: sucralose/cyclamate | 45 |
| cyclamate/saccharin | 47 |
| sucralose/saccharin | 8 |
| 8: sucralose/cyclamate | 55 |
| cyclamate/saccharin | 37 |
| sucralose/saccharin | 8 |
| 9: sucralose/cyclamate | 28 |
| cyclamate/saccharin | 67 |
| sucralose/saccharin | 5 |

EXAMPLE 4

Apportionment of synergy in a quaternary combination

Synergies between pairs of the low-colorie sweeteners included in the ternary combination of sucralose, cyclamate, saccharin and aspartame, 1:1:1:1 (combination 11, Table 2) in a cola beverage (other than those already estimated) were estimated by the methods described in Example 1. The results are set out in Table 4.

TABLE 4

| Combination | Sweetness contribution | Synergy | Saving (%) |
|---|---|---|---|
| sucralose/aspartame | 50/50 | 4 | 4 |
| cyclamate/aspartame | 50/40 | 67 | 40 |
| saccharin/aspartame | 50/50 | 100 | 50 |

The percentage contribution of each pair of sweeteners in the combination to the overall synergy was estimated by the method described in Example 3. The results were as follows:
  sucralose/cyclamate: 20
  cyclamate/saccharin: 31
  sucralose/saccharin: 4
  sucralose/aspartame: 1
  cyclamate/aspartame: 18
  saccharin/aspartame: 26

EXAMPLE 5

Low Calorie Carbonated Cola Beverage

| | % w/v |
|---|---|
| Phosphoric Acid (88%) | 0.0154 |
| Sodium benzoate | 0.0154 |
| Cola extract (Naarden) | 0.48 |
| Cola essence (Naarden) | 0.1 |
| Sucralose | 0.0046 |
| Cyclamate | 0.0613 |
| Carbonated water to | 100 |

(note, if there were no synergy the amounts of sucralose and cyclamate present for a 50:50 sweetness share equivalent to 8.5% sucrose would need to be 0.008% and 0.1075%)

EXAMPLE 6

Low Calorie Carbonated Cola Beverage

The sweetener combination in Example 1 was replaced by sucralose, cyclamate and acesulpham K in weight ratio of 1:1.67:1.14 (Composition No. 4) in the following percentages:

| | % | (theorectical %) required) |
|---|---|---|
| Sucralose | 0.0065 | 0.0117 |
| Cyclamate | 0.0107 | 0.0194 |
| Acesulpham | 0.0074 | 0.0133 |

EXAMPLE 7

Low Calorie Carbonated Cola Beverage

The sweetener composition of Example 1 was replaced by sucralose, cyclamate, saccharin and aspartame in a weight ratio of about 1:13.5:2.15:2.65 (Composition No. 11) in the following percentages:

| | % | (theorectical % required) |
|---|---|---|
| Sucralose | 0.002 | 0.004 |
| Cyclamate | 0.0265 | 0.0538 |
| Saccharin | 0.0042 | 0.0086 |
| Aspartame | 0.0052 | 0.0106 |

EXAMPLE 8

Low Calorie Carbonated Lemon-flavoured Beverage

A beverage concentrate is prepared with the composition:
  sodium benzoate: 160 mg
  citric acid: 1.7 g
  lemonade essence: 0.8 g
  sucralose: 46 mg
  cyclamate: 613 mg
  water: to 100 ml
A similar concentrate has the alternative sweetener:
  sucralose: 65 mg
  cyclamate: 107 mg
  acesulpham K: 74 mg
The concentrates are diluted to 1 liter with carbonated water.

EXAMPLE 9

"Table Top" Sweetening Composition

A bulked sweetener having the same sweetness in tea and coffee as an equivalent volume of sucrose (granulated sugar) is prepared by mixing the following ingredients and spray-drying to a bulk density of 0.2 g/ml:
  maltodextrin solution containing
  dry weight: 222.2 g
  sucralose: 0.54 g
  cyclamate: 12.34 g
(theoretical amount: sucralose 0.67 g; cyclamate 15.4 g).

I claim:
1. A method of sweetening a beverage for incorporating therein a combination of two components: component 1, a chlorosucrose sweetener; and component 2, cyclamate, either alone or in combination with one or two other low calorie sweeteners, the sweetness contribution ratio of the two components in the mixture being from 90%:10% to 10%:90% respectively, the percentage sweetness contribution provided by the cyclamate in component 2 being from 30 to 100%.

2. A method according to claim 1 in which the chlorosucrose sweetener is 4,1',6'-trichloro-4,1',6'-trideoxygalactosucrose.

3. A method according to claim 2, in which the sweetness contribution ratio is respectively from 80%:20% to 20%:80%.

4. A method according to claim 3, in which the sweetness contribution ratio is respectively from 60%:40% to 40%:60%.

5. A method according to claim 2, in which component 2 contains cyclamate and a sweetener selected from the group consisting of dipeptide sweeteners, saccharin and acesulpham K.

6. A method according to claim 2, in which the beverage is selected from the group consisting of cola, tea and coffee.

7. A method according to claim 2 in which the composition is a ternary or quaternary composition and the sweetness contribution ratio is from 18%:82% to 73%:27%.

8. A method according to claim 7 in which a quaternary composition is used with a sweetness contribution ratio of about 25%:75%.

9. A sweetened beverage in which the sweetness is provided by a combination of two components: component 1, a chlorosucrose sweetener; and component 2, cyclamate, either alone or in combination with one or two other low calorie sweeteners, the sweetness contribution ratio of the two components in the mixture being from 90%:10% to 10%:90% respectively, the percentage sweetness contribution provided by the cyclamate in component 2 being from 30 to 100%.

10. A beverage according to claim 9 in which the chlorosucrose sweetener is 4,1',6'-trichloro-4,1',6'-trideoxygalactosucrose.

11. A beverage according to claim 10, in which the composition is a ternary or quaternary composition and the said sweetness contribution ratio is from 18%:82% to 73%:27%.

12. A beverage according to claim 13, in which the composition is a quaternary composition with a respective sweetness contribution ratio of about 25%:75%.

13. A beverage according to claim 10, in which component 2 contains cyclamate and one or two sweeteners selected from the group consisting of dipeptide sweeteners, saccharin and acesulpham K.

14. A beverage according to claim 10 in a form selected from the group consisting of a carbonated soft drink, tea or coffee.

15. A beverage according to claim 14 in the form of cola.

16. A bottling concentrate for dilution with carbonated water to provide a carbonated soft drink according to claim 14.

17. A beverage according to claim 10 containing the two components in a respective sweetness contribution ratio of from 80%:20% to 20%:80%.

18. A beverage according to claim 17 containing the two components in a respective sweetness contribution ratio of from 60%:40% to 40%:60%.

19. A sweetening composition comprising a combination of two components: component 1, a chlorosucrose sweetener; and component 2, cyclamate, either alone or in combination with one or two other low calorie sweeteners, the sweetness contribution ratio of the two components in the mixture being from 90%:10% to 10%:90% respectively, the percantages sweetness contribution provided by the cyclamate in component 2 being from 30 to 100%, in combination with a carrier.

20. A sweetener composition according to claim 15 in which the chlorosucrose sweetener is 4,1',6'-trichloro-4,1',6'-trideoxygalactosucrose.

* * * * *